Patented Aug. 24, 1926.

1,597,436

UNITED STATES PATENT OFFICE.

ALEX BROOKING DAVIS, OF CINCINNATI, OHIO, ASSIGNOR TO A. B. DICK COMPANY, OF CHICAGO, ILLINOIS, A CORPORATION OF ILLINOIS.

STENCIL-SHEET COATING COMPOSITION AND SHEET MADE THEREWITH.

No Drawing.    Application filed May 26, 1925.  Serial No. 33,054.

This invention relates to type-impressible stencil sheets and concerns more particularly the composition with which the base, usually of porous paper such as yoshino, is coated. For this purpose it is common to employ a colloid, as gelatin, which is first put into solution in water and then modified, as by softening ingredients and the like, before application to the base. It has also been proposed to employ an emulsion containing a colloid, as gelatin, which is water-soluble and certain oils, fats and pigments which are water-insoluble. So far as I am aware, however, no stencil coating has ever been made from a colloid of the protein type in the absence of water or from a protein solution which is purely organic in character.

This invention is based upon the fact that certain proteins, gelatin for instance, are soluble in organic solvents, and in the case of gelatin, in ethylene glycol and in glycerin, and to this organic solution of gelatin there may be added numerous other products which are soluble in organic solvents for the tempering or modifying of the solution and softening of the resulting film, and the solution may also be diluted with organic solvents without precipitation of the protein. Furthermore, such solutions may be kept sterile by the addition of an organic disinfectant and the proteins may be coagulated by a product soluble in the organic solution of the protein. Other colloids than the proteins, capable of a high degree of dispersion and soluble in organic solvents, may be used in similar manner.

Stencil sheet coating compositions of this character can be cheaply and easily prepared, since the amount of volatile solvent required is small and with certain combinations may be omitted entirely. Also they can be easily applied by the usual process of drawing the porous base sheets through or floating them over the composition while hot, after which the coated sheets may be hung in the air for a short time to attain a moisture balance, when they will be ready for use. Pigments or dyestuffs may be added to the base, either in solution or suspension, to give color to the finished stencil sheet and other insoluble pigments may be added to give body to the mass if desired.

As an illustration of a stencil sheet coating composition employing the present invention, the following process may be observed: Finely divided commercial gelatin is dissolved in ethylene glycol at water bath temperature to a 20% solution. The gelatin dissolves rapidly at water bath temperature and a smooth solution results in two or three hours' time. To 50 grams of the above 20% solution of gelatin in ethylene glycol, there are added 50 gms. glycerin, 75 cc. alcohol, 15 gms. stearic acid and 5 gms. oleic acid, the last four constituents having been previously mixed and heated to a sufficient temperature to bring about liquefication. A porous base sheet, such as yoshino paper, is now floated on or drawn through the above mixture at a temperature of 70 deg. C., and the resulting sheets upon cooling will be found coated with a homogeneous uniform film, the whole constituting a type-impressible stencil sheet capable of yielding large numbers of copies on the usual types of duplicating machines.

Should it be desirable to coagulate the gelatin, either in whole or in part, this may be done by the addition to the above formula of paraldehyde. One gm. of this substance gives good results with the above formula. One gm. of beta naphthol added thereto will act as a disinfectant and prevent the formation of molds. Such white pigments as zinc oxide or blanc fixe may be added to the above solution to give opacity, certain liquid constituents being increased, if desired, to maintain a proper body suitable for pulling the stencils. Prussian blue may be added as a coloring matter or a dyestuff soluble in alcohol, such as Victoria blue, is suitable for this purpose.

The ethylene glycol may be replaced in whole or in part by glycerin, since gelatin is soluble in glycerin, and I do not restrict myself to the use of stearic and oleic acids, since these act primarily as internal lubricants as well as to modify the texture of the resulting film, and other oils, fats and waxes may be used for this purpose. Other disinfectants, such as thymol, may be substituted for the beta naphthol, and the paraldehyde as a coagulant may be replaced by other coagulating agents such as hexamethylene tetramine.

The solutions used in the manufacture of such stencils are characterized by being mainly anhydrous and by the term anhydrous, I mean that no water is necessary in the formula and that the constituents thereof, as well as the solvents therefor, are practically water-free.

A claim:—

1. As a stencil sheet coating composition, a protein dissolved in a substantially anhydrous organic solvent and a modifying agent.

2. As a stencil sheet coating composition, gelatin dissolved in a polyhydric alcohol and the resulting mass modified by the addition of agents soluble in said polyhydric alcohol.

3. A stencil sheet coating composition employing gelatin dissolved in ethylene glycol, mixed with a solution of modifying agents which is miscible with the gelatin solution in ethylene glycol.

4. A stencil sheet coating composition employing gelatin dissolved in ethylene glycol and glycerin, with which is mixed an alcoholic solution of stearic and oleic acids in such proportion as to produce a homogeneous, type-impressible film.

5. A stencil sheet coating composition employing a colloid dissolved in a substantially anhydrous organic solvent, mixed with a solution of modifying agents in a substantially anhydrous solvent, said solution being miscible with the solution of the colloid, and a coagulant, the whole producing a homogeneous, type-impressible film.

6. A type-impressible stencil sheet comprising a porous base having a coating including a protein in a substantially anhydrous organic solvent and a modifying agent.

7. A type-impressible stencil sheet comprising a porous base having a coating including a protein in a substantially anhydrous organic solvent, a modifying agent and a coagulant.

This specification signed this 22nd day of May, 1925.

ALEX BROOKING DAVIS.